United States Patent
Li et al.

(10) Patent No.: US 12,105,629 B2
(45) Date of Patent: Oct. 1, 2024

(54) ADAPTIVE CACHE INDEXING FOR A STORAGE DEVICE

(71) Applicant: Samsung Electronics Co., Ltd., Suwon-si (KR)

(72) Inventors: Zongwang Li, Dublin, CA (US); Sahand Salamat, San Diego, CA (US); Rekha Pitchumani, Oak Hill, VA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 17/890,604

(22) Filed: Aug. 18, 2022

(65) Prior Publication Data
US 2024/0028512 A1 Jan. 25, 2024

Related U.S. Application Data

(60) Provisional application No. 63/391,850, filed on Jul. 25, 2022.

(51) Int. Cl.
*G06F 12/0817* (2016.01)
*G06F 12/14* (2006.01)

(52) U.S. Cl.
CPC ...... *G06F 12/0828* (2013.01); *G06F 12/1458* (2013.01)

(58) Field of Classification Search
CPC .......................... G06F 12/0828; G06F 12/1458
See application file for complete search history.

(56) References Cited

U.S. PATENT DOCUMENTS

| | | |
|---|---|---|
| 5,510,934 A | 4/1996 | Brennan et al. |
| 5,651,125 A | 7/1997 | Witt et al. |
| 5,809,562 A | 9/1998 | Gaskins et al. |
| 6,470,437 B1 | 10/2002 | Lyon |
| 6,493,812 B1 | 12/2002 | Lyon |
| 7,117,290 B2 | 10/2006 | Shen et al. |
| 7,428,617 B2 | 9/2008 | Okawa et al. |
| 7,958,318 B2 | 6/2011 | Sakata et al. |
| 9,612,970 B2 | 4/2017 | Palacharla et al. |
| 10,089,238 B2 | 10/2018 | Palacharla et al. |
| 10,489,303 B2 | 11/2019 | Swaine |
| 10,761,998 B2 | 9/2020 | Grant |
| 10,942,859 B2 | 3/2021 | Kim et al. |
| 2008/0229027 A1* | 9/2008 | Shioya ................ G06F 12/0862 711/137 |

(Continued)

FOREIGN PATENT DOCUMENTS

| | | |
|---|---|---|
| CN | 114764416 A | 7/2022 |
| JP | 08212133 A | 8/1996 |

OTHER PUBLICATIONS

Givargis, Tony, "Improved indexing for cache Miss Reduction in Embedded Systems," Proceedings of the 40th Annual Design Automation Conference, DAC, Jun. 2003, pp. 875-880.

(Continued)

*Primary Examiner* — Gurtej Bansal
(74) *Attorney, Agent, or Firm* — Lewis Roca Rothgerber Christie LLP

(57) ABSTRACT

Provided is a method of data storage, the method including receiving, from an application, a request to access data stored on a storage device, identifying a data access pattern of the application, and storing the data in a cache of the storage device based on the data access pattern.

20 Claims, 5 Drawing Sheets

(56) References Cited

U.S. PATENT DOCUMENTS

2010/0180085 A1* 7/2010 Dave .................. G06F 12/0831
                                                    711/146
2015/0205535 A1   7/2015 Joshi et al.
2015/0269027 A1* 9/2015 Wan ................... G06F 12/0893
                                                    714/6.12

OTHER PUBLICATIONS

EPO Extended European Search Report dated Dec. 7, 2023, issued in corresponding European Patent Application No. 23180942.7 (11 pages).

* cited by examiner

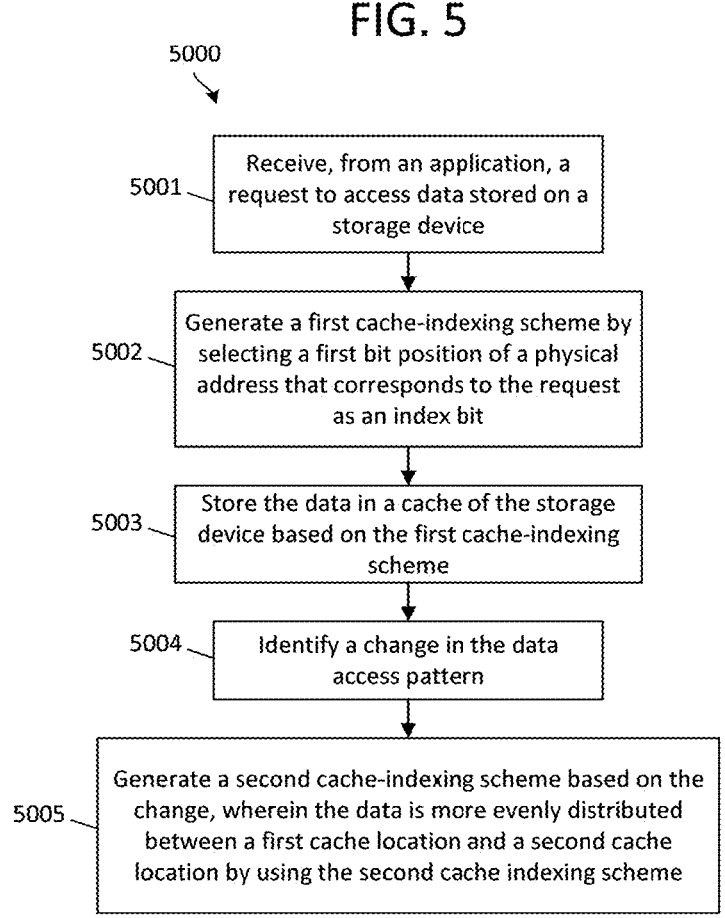

ADAPTIVE CACHE INDEXING FOR A STORAGE DEVICE

CROSS-REFERENCE TO RELATED APPLICATION(S)

The present application claims priority to, and the benefit of, U.S. Provisional Application Ser. No. 63/391,850, filed Jul. 25, 2022, entitled "ADAPTIVE CACHE ARCHITECTURE WITH DYNAMIC INDEX SET ADJUSTMENT FOR COMPUTATIONAL CXL SSD," the entire content of which is incorporated herein by reference.

FIELD

One or more aspects of one or more embodiments according to the present disclosure relate to systems and methods for data storage.

BACKGROUND

The present background section is intended to provide context only, and the disclosure of any embodiment or concept in this section does not constitute an admission that said embodiment or concept is prior art.

In the field of computer storage, a storage system (e.g., a system) may include a host and a storage device. The storage device may include a cache and a non-volatile memory. The cache may store data, which is also stored on the non-volatile memory, on a memory type that allows for quicker access to the data than the non-volatile memory allows. The cache memory type may include (e.g., may be) a dynamic random access memory (DRAM) and/or a static random access memory (SRAM). The non-volatile memory may include a NAND flash memory. To allow for addressing of the data stored in the cache, the cache memory may be divided (e.g., logically divided) into cache sets. Each cache set may include a same number of cache lines as each of the other cache sets. As used herein, a cache line may refer to a precise location for storing data.

An application may run on the host. The application may send a data access request (e.g., a read or write request) to access data stored on the storage device. The data access request may include a physical address corresponding to data stored on the storage device. The system may store data in the cache according to an addressing methodology. For example, the system may follow a cache-indexing policy to determine where to store data in the cache. The cache performance may be affected by the cache-indexing policy.

Accordingly, there may be methods, devices, and systems that are suitable for improving access to data stored on a cache.

SUMMARY

Aspects of one or more embodiments of the present disclosure relate to computer storage systems and provide improvements to cache addressing.

According to one or more embodiments of the present disclosure, there is provided a method of data storage, the method including receiving, from an application, a request to access data stored on a storage device, identifying a data access pattern of the application, and storing the data in a cache of the storage device based on the data access pattern.

The request may indicate a memory address corresponding to the data, and the method may further include generating a first cache-indexing scheme based on the data access pattern, selecting a first set of bit positions as an index bit set, and selecting a second set of bit positions as a cache tag bit set.

The method may further include identifying a change in the data access pattern, and generating a second cache-indexing scheme based on the change, wherein the data is more evenly distributed between a first cache location and a second cache location using the second cache-indexing scheme than using the first cache-indexing scheme.

The method may further include programming a cache controller of the storage device to implement the first cache-indexing scheme by using a cache coherent protocol.

The method may further include generating a cache tag and a cache index respectively based on the cache tag bit set and the index bit set.

The first set of bit positions may be selected as the index bit set based on a flip frequency of each bit position in the first set of bit positions.

The first set of bit positions may be selected as the index bit set based on a degree of correlation with a different bit position.

The first set of bit positions may be selected as the index bit set, instead of a different bit position, based on a degree of correlation with the different bit position.

According to one or more other embodiments of the present disclosure, there is provided a storage device, including a non-volatile memory, a cache, and a processing circuit configured to receive, from an application, a request to access data stored on the non-volatile memory, identify a data access pattern of the application, and store the data in the cache of the storage device based on the data access pattern.

The request may indicate a memory address corresponding to the data, and the processing circuit may be configured to store the data in the cache by generating a first cache-indexing scheme based on the data access pattern, selecting a first set of bit positions as an index bit set, and selecting a second set of bit positions as a cache tag bit set.

The storage device may be configured to identify a change in the data access pattern and generate a second cache-indexing scheme based on the change, wherein the data is more evenly distributed between a first cache location and a second cache location using the second cache-indexing scheme.

The storage device may be configured to program a cache controller of the storage device to implement the first cache-indexing scheme by using a cache coherent protocol.

The storage device may be configured to generate a cache tag and a cache index for the memory address based on the first bit position.

The storage device may be configured to select the first set of bit positions as the index bit set based on a flip frequency of each bit position in the first set of bit positions.

According to one or more other embodiments of the present disclosure, there is provided a system for data storage, including a host, a storage device, and a non-transitory computer readable medium implemented on the storage device, and having computer code that, when executed on a processor, implements a method of data storage, the method including receiving, from an application on the host, a request to access data stored on the storage device, identifying a data access pattern of the application based on the request, and storing the data in a cache of the storage device based on the data access pattern.

The request may indicate a memory address corresponding to the data, and the storing may include generating a first cache-indexing scheme based on the data access pattern, selecting a first set of bit positions as an index bit set, and selecting a second set of bit positions as a cache tag bit set.

The computer code, when executed on the processor, may further implement the method of data storage by identifying a change in the data access pattern and generating a second cache-indexing scheme based on the change, and wherein the data is more evenly distributed between a first cache location and a second cache location using the second cache-indexing scheme.

The computer code, when executed on the processor, may further implement the method of data storage by programming a cache controller of the storage device to implement the first cache-indexing scheme by using a cache coherent protocol.

The computer code, when executed on the processor, may further implement the method of data storage by generating a cache tag and a cache index respectively based on the cache tag bit set and the index bit set.

The first set of bit positions may be selected as the index bit set based on a flip frequency of each bit position in the first set of bit positions.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

FIG. 5 is a flowchart depicting methods of storing data in a cache based on a data access pattern, according to one or more embodiments of the present disclosure.

Figure 1:
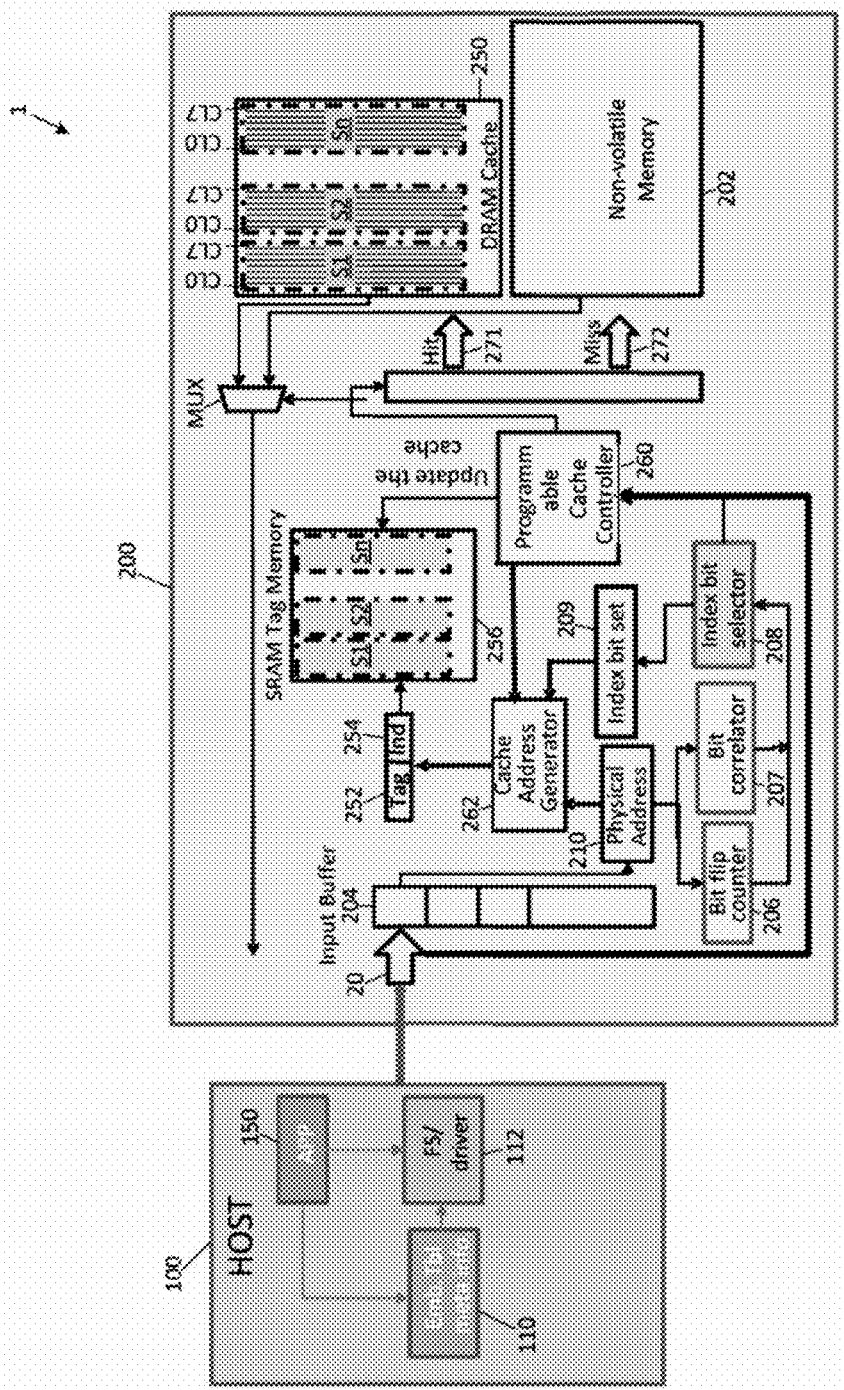
FIG. 1 is a system diagram depicting a data storage system for storing data in a cache based on a data access pattern, the system including an index bit selector on a storage-device side, according to one or more embodiments of the present disclosure.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements, layers, and regions in the figures may be exaggerated relative to other elements, layers, and regions to help to improve clarity and understanding of various embodiments. Also, common but well-understood elements and parts not related to the description of the embodiments might not be shown to facilitate a less obstructed view of these various embodiments and to make the description clear.

DETAILED DESCRIPTION

Aspects of the present disclosure and methods of accomplishing the same may be understood more readily by reference to the detailed description of one or more embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey aspects of the present disclosure to those skilled in the art. Accordingly, description of processes, elements, and techniques that are not necessary to those having ordinary skill in the art for a complete understanding of the aspects and features of the present disclosure may be omitted.

Unless otherwise noted, like reference numerals, characters, or combinations thereof denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the detailed description, for the purposes of explanation, numerous specific details are set forth to provide a thorough understanding of various embodiments. It is apparent, however, that various embodiments may be practiced without these specific details or with one or more equivalent arrangements.

It will be understood that, although the terms "zeroth," "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or component is referred to as being "on," "connected to," or "coupled to" another element or component, it can be directly on, connected to, or coupled to the other element or component, or one or more intervening elements or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or component is referred to as being "between" two elements or components, it can be the only element or component between the two elements or components, or one or more intervening elements or components may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, each of the terms "or" and "and/or" includes any and all combinations of one or more of the associated listed items.

For the purposes of this disclosure, expressions such as "at least one of," when preceding a list of elements, modify the entire list of elements and do not modify the individual elements of the list. For example, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Any of the components or any combination of the components described (e.g., in any system diagrams included herein) may be used to perform one or more of the operations of any flow chart included herein. Further, (i) the operations are merely examples, and may involve various additional operations not explicitly covered, and (ii) the temporal order of the operations may be varied.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As mentioned above, in the field of computer storage, a storage system (e.g., a system) may include a host and a storage device. The storage device may include a cache and a non-volatile memory. The cache may store data, which is also stored on the non-volatile memory, on a memory type that allows for quicker access to the data than with the non-volatile memory. The cache memory type may include a variety of memory types. For example, the cache memory may be a volatile memory type, including a dynamic random access memory (DRAM) and/or a static random access memory (SRAM). The non-volatile memory may include a variety of memory types. For example, the non-volatile memory may include a NAND flash memory or another memory type. In some embodiments, the non-volatile memory may correspond to a memory tier (including volatile and non-volatile memory). To allow for addressing of the data stored in the cache, the cache memory may be divided (e.g., logically divided) into cache sets. Each cache set may be further divided into cache lines. For example, each cache set may include the same number of cache lines as each of the other cache sets. As used herein, a cache line may refer to a precise location for storing data.

An application may run on the host. The application may send a data access request (e.g., a read or write request) to access data stored on the storage device. The data access request may include a physical address corresponding to data stored on the storage device. The system may store data in the cache according to a corresponding addressing methodology. For example, the system may follow a cache-indexing policy to determine where to store data in the cache. The cache performance may be affected by the cache-indexing policy.

Improving space utilization and reducing conflicts may improve overall performance of a cache. Accordingly, it may be suitable to develop methods, devices, and systems for improving space utilization and for reducing cache conflict through adaptive cache indexing.

With recent advancements in general purpose processors and application-specific accelerators, storage devices may become a source of bottleneck issues in computer systems. Adding a layer of cache to storage devices may reduce overall access time when the data is available in the cache. A layer of cache (e.g., a layer of DRAM cache or other types of memory) may provide faster access in the case of a cache hit. Increasing the hit rate of the cache layer may significantly improve storage device performance.

Additionally, cache performance may be improved for storage devices that are configured to utilize cache coherent protocols, such as Compute Express Link for Memory Expansion (CXL-SSD) because such storage devices may be based on NAND media (e.g., relatively slow media) as a main memory/storage. For example, because such storage devices often use relatively slow media, they may be suitable candidates for overall device performance improvements through improved cache performance.

Using a bigger cache may not be suitable in many applications due to power and area limitations. Improving the cache architecture (e.g., set-associative, direct mapping, etc.) may affect the cache hit rate and performance. Improving replacement policies (e.g., Least Recently Used (LRU), Least Frequently Used (LFU), etc.) may affect the hit rate, but may be application-dependent.

In some cache-indexing schemes, cache-index bitmapping may be based on fixed index bit positions that may not distribute data blocks evenly among cache sets. Such uneven distribution of data in the cache may cause set conflict (e.g., cache set conflict), especially for applications having data spanning only across a fractional space of the whole memory address space. Problems of some technologies may include: (i) not having access to virtual (e.g., logical) addresses and physical addresses; (ii) cache indexing failing to consider an application's characteristics; and (iii) cache architectures failing to support reconfigurations during the runtime.

A system with adaptive cache indexing may improve space utilization and may reduce cache conflict in the cache of a storage device by adjusting cache addressing based on data access patterns. An application running on a host may send requests to access data stored on the storage device. The host or the storage device may analyze characteristics of the access pattern of the application, and may determine an addressing scheme to improve space utilization and to reduce cache conflict based on the characteristics of the access pattern. The storage device cache may be reprogrammed to implement improved addressing schemes to adapt to changes in data access patterns.

For example, the host or the storage device may include a bit flip counter and a bit correlator to analyze flip frequencies of, and correlations between, each bit position in the physical addresses of a data access pattern. Bit positions that have high flip frequencies in the data access pattern, and that are not highly correlated with other bit positions having high flip frequencies, may be selected as index bits for an index bit set. As a result, the index bit set, and its corresponding cache-indexing scheme, may be selected based on the data access pattern to more evenly distribute data across the cache lines and cache sets of the storage device cache.

Additionally, the system may change the cache-indexing scheme in response to detecting (e.g., determining) that the characteristics of the data access pattern have change beyond a threshold to more evenly distribute data across the cache lines and cache sets of the storage device cache.

FIG. 1 is a system diagram depicting a data storage system for storing data in a cache based on a data access pattern, the system including an index bit selector on a storage-device side, according to one or more embodiments of the present disclosure.

Referring to FIG. 1, the system 1 may include a host 100 and a storage device 200. The storage device 200 may include a tag memory 256, a cache 250, and a non-volatile memory 202. The tag memory 256 may include (e.g., may be) a Static Random Access Memory (SRAM). The cache 250 may include (e.g., may be) a Dynamic Random Access Memory (DRAM). The storage device 200 may include a multiplexer MUX configured to assist in controlling whether data is retrieved from the cache 250 or from the non-volatile memory 202. For example, the storage device 200 may access data from the cache 250 based on determining that a cache hit 271 has occurred. Contrastingly, the storage device 200 may access data from the non-volatile memory 202 based on determining that a cache miss 272 has occurred.

The cache 250 may be divided (e.g., logically divided) into cache sets (e.g., a first set S1, a second cache set S2, and an n-th cache set Sn). Each cache set may include cache lines CL (e.g., a 0-th cache line CL0 through a 7-th cache line CL7). Each cache set may include a same number of cache lines CL. The tag memory 256 may be divided (e.g., logically divided) into cache sets (e.g., a first cache set S1, a second cache set S2, and an n-th cache set Sn) corresponding to the cache sets of the cache 250.

The storage device may also include an input buffer 204. The input buffer 204 may be configured to receive a physical address 210 (or a logical address or another type of memory address) from the host 100. The system 1 may include components for analyzing and selecting the cache-indexing scheme. For example, in one or more embodiments, the storage device 200 may include a bit flip counter 206, a bit correlator 207, and an index bit selector 208. The system 1 may include components for setting and adjusting a cache-indexing scheme. For example, the storage device 200 may include a cache controller 260 (e.g., a programmable cache controller) and a cache address generator 262. In one or more embodiments, one or more of the bit flip counter 206, the bit correlator 207, the index bit selector 208, the cache controller 260, and the cache address generator 262 may be implemented in hardware of the storage device 200 (e.g., in a field programmable gate array (FPGA), an application specific integrated circuit (ASIC), etc.).

The host 100 may include an application 150, embedded table metadata information 110, and a file system (FS)/driver 112. The application 150 may send requests to the storage device using metadata (e.g., meta info) from the embedded table metadata information 110. For example, the embedded table metadata information 110 may include information for translating a virtual address (e.g., a logical address) to a physical address 210 (or a logical address or another type of memory address). In some embodiments, the application 150 and the FS/driver 112 may run on a processing circuit of the host (e.g., a central processing unit (CPU) or a graphics processing unit (GPU)), and the embedded table metadata information 110 may be stored on a memory of the host associated with the processing circuit of the host (e.g., a host cache, or other type of memory). While the present disclosure refers to the storage device 200 receiving a physical address 210 from the host 100, it should be understood that the present disclosure is not limited thereto. For example, in some embodiments, the storage device 200 may receive a logical address or other types of memory addresses from the host and may translate the logical address to a physical address at the storage device 200. In such embodiments, a tag 252 and/or an index 254 for the cache 250 may be taken from the received logical address or from a translated address (e.g., a second logical address or a physical address that is obtained based on a translation of the logical address).

The cache controller 260 may be programmed by a processing circuit (e.g., an accelerator) to update cache-indexing schemes. In one or more embodiments, the cache controller 260 may be programmed by the processing circuit using a cache coherent protocol (e.g., Compute Express Link (CXL)). The term "processing circuit" is used herein to mean any combination of hardware, firmware, and software, employed to process data or digital signals. Processing circuit hardware may include, for example, ASICs, general purpose or special purpose CPUs, digital signal processors (DSPs), GPUs, and programmable logic devices such as field programmable gate arrays (FPGAs). In a processing circuit, as used herein, each function is performed either by hardware that is configured (e.g., hard-wired) to perform that function, or by more general-purpose hardware, such as a CPU, that is configured to execute instructions stored in a non-transitory storage medium. A processing circuit may be fabricated on a single printed circuit board (PCB) or may be distributed over several interconnected PCBs. A processing circuit may contain other processing circuits. For example, a processing circuit may include two processing circuits, an FPGA and a CPU, interconnected on a PCB.

The index bit selector 208 may select an index bit set 209 corresponding to bit positions of the physical address 210 (or a logical address or another type of memory address). For example, the index bit selector 208 may be configured to select the index bit set 209 based on a data access pattern. The index bit selector 208 may select bit positions corresponding to the physical addresses 210 (or logical addresses or other types of memory addresses) of a data access pattern based on a flip frequency of, and a correlation between, the bit positions. For example, the index bit selector 208 may select one or more corresponding bit positions as index bits of the index bit set 209 based on the corresponding bit positions having (i) a relatively high flip frequency and (ii) a relatively low correlation.

Still referring to FIG. 1, a read flow process may include the following operations corresponding to the system 1. The application 150 may have a virtual address corresponding to data to be read from the storage device 200. The host 100 may use the embedded table metadata information 110 and the FS/driver 112 to translate the virtual address to a physical address. The host 100 may send a read request, including the physical address, to the storage device 200. The storage device 200 may receive the read request at the input buffer 204. The cache address generator 262 may generate a tag 252 (e.g., a cache tag) and an index 254, which correspond to the physical address 210 (or a logical address or another type of memory address), based on a cache-indexing scheme (e.g., a cache-indexing policy). The index 254 may include (e.g., may be) a first set of one or more bit positions. The tag 252 may include (e.g., may be) a second set of one or more bit positions. For example, as discussed in more detail below, the bit positions of the index bit set 209 may be selected based on an access pattern of the application 150. The cache address generator 262 may generate the tag 252 and the index 254 based on characteristics of each bit position of the index bit set 209.

The storage device 200 may search the tag memory 256 for a match to the tag 252. If no match to the tag 252 is found in the tag memory 256, the cache controller 260 may determine that a cache miss 272 has occurred, and may read the data from the non-volatile memory 202. In addition to reading the data from the non-volatile memory 202, the storage device 200 may also write the data to the cache 250 in accordance with the cache-indexing scheme. For example, the storage device 200 may store the data to a location in the cache 250 corresponding to the index 254 and the tag 252. The storage device 200 may record the tag 252 in the tag memory 256 corresponding to the data location in the cache 250. The storage device 200 may send the data to the host 100.

On the other hand, if a match to the tag 252 is found in the tag memory 256, the cache controller 260 may determine that a cache hit 271 has occurred. The location of the tag 252 within the tag memory 256 may indicate the data is located in a corresponding cache set (e.g., the second cache set S2). The index 254 may indicate the data is located in a corresponding cache line (e.g., the 7-th cache line CL7) of the cache set (e.g., the second cache set S2). An offset 255 of the physical address 210 (or a logical address or another type of memory address) (see FIGS. 3A and 4A) may indicate a precise location of the data within the cache line of the cache set. Accordingly, the storage device 200 may read the data from the cache 250, and may send the data to the host 100.

According to one or more aspects of one or more embodiments of the present disclosure, the cache-indexing scheme may be determined based on information generated from an access pattern of the application 150. For example, and as will be discussed in further detail below with reference to FIGS. 3A-4B, a flip frequency (e.g., a frequency at which a bit position is changed between 0 and 1) may be determined for each bit position corresponding to the physical addresses included in an access pattern. Additionally, a correlation (e.g., a degree of correlation) may be determined between each bit position corresponding to the physical addresses included in the access pattern.

The cache-indexing scheme may be implemented to improve a distribution of the data within the cache 250 using the information generated from the access pattern of the application 150. For example, with respect to flip frequency, three bit positions may initially be selected as candidates for an index bit set 209 because all three bit positions have a high flip frequency. With respect to correlation, two of the bit positions may frequently flip at the same time (e.g., the two bit positions may have a high correlation), while two of the bit positions may nearly never flip at the same time (e.g., the two bit positions may have a low correlation). Accordingly, the system 1 may select the two bits having the high flip frequency and the two bits having the low correlation to be index bits 222 (see FIG. 4B) in the index bit set 209 to provide a cache-indexing scheme that distributes the data in the cache 250 more evenly across the cache lines CL (e.g., 0-th to 7-th cache lines CL0-CL7) and the cache sets (e.g., first to n-th cache sets S1-Sn).

Additionally, the system 1 may identify a change in the data access pattern based on the flip frequencies of, and correlations between, the bit positions. For example, if a change in the characteristics of the bit positions exceeds a threshold, the system 1 may adjust the index bit set and, thereby, may change to a new cache-indexing scheme by selecting new bit positions as the index bits to more evenly distribute the data in the cache 250. Accordingly, the storage device cache may be reprogrammed to implement an improved addressing scheme to adapt to changes in the data access pattern. In some embodiments, the cache may be cleared (e.g., completely cleared of data) and repopulated according to the new cache-indexing scheme.

Figure 2:
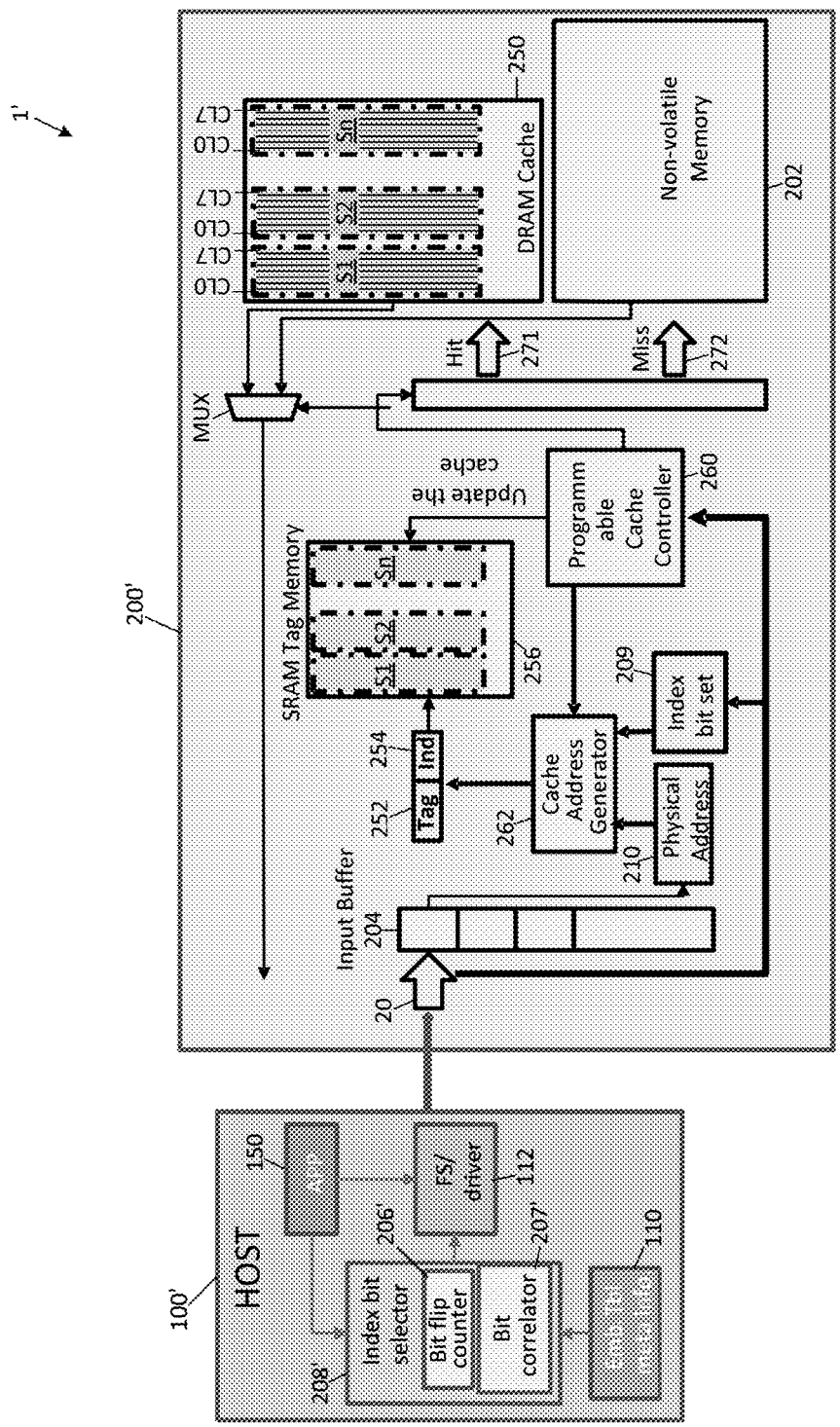
FIG. 2 is a system diagram depicting a data storage system for storing data in a cache based on a data access pattern, the system including an index bit selector on a host side, according to one or more embodiments of the present disclosure.

FIG. 2 is a system diagram depicting a data storage system for storing data in a cache based on a data access pattern, the system including an index bit selector on a host side, according to one or more embodiments of the present disclosure.

Referring to FIG. 2, in one or more embodiments, a system 1' may include components for analyzing and selecting the cache-indexing scheme on a host side instead of the storage-device side of the system 1'. For example, in one or more embodiments, a host 100' may include a bit flip counter 206', a bit correlator 207', and an index bit selector 208'. In such embodiments, the index bit selector 208' may select the index bit set 209 based on the embedded table metadata information 110 and based on the access pattern of the application 150. In such embodiments, the bit flip counter 206', the bit correlator 207', and the index bit selector 208' may be implemented in a software of the host 100'.

The remaining components shown in FIG. 2 operate in a manner substantially similar to corresponding components shown in FIG. 1. Accordingly, repeated detailed description thereof will be omitted.

Figure 3A:
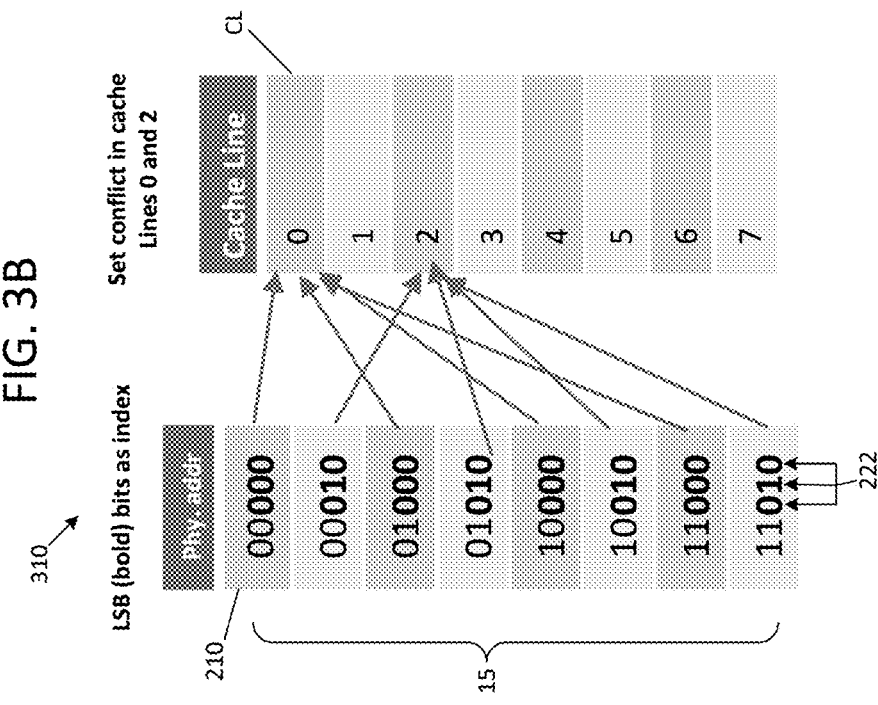
FIG. 3A is a diagram depicting bit sections of a physical address according to a first cache-indexing scheme, according to one or more embodiments of the present disclosure.

FIG. 3A is a diagram depicting bit sections of a physical address according to a first cache-indexing scheme, according to one or more embodiments of the present disclosure.

Referring to FIG. 3A, the physical addresses 210 (or logical addresses or other types of memory addresses) of each request (e.g., read requests and write requests) may be divided into a tag 252, an index 254, and an offset 255 to respectively represent a cache hit, a cache line, and a cache line size. For example, a physical address may include 40 bit positions (e.g., bit positions 0-39). According to a first cache-indexing scheme 310, bit positions 19-39 may correspond to the tag 252, bit positions 9-18 may correspond to the index 254, and bit positions 0-8 may correspond to the offset 255.

Figure 3B:
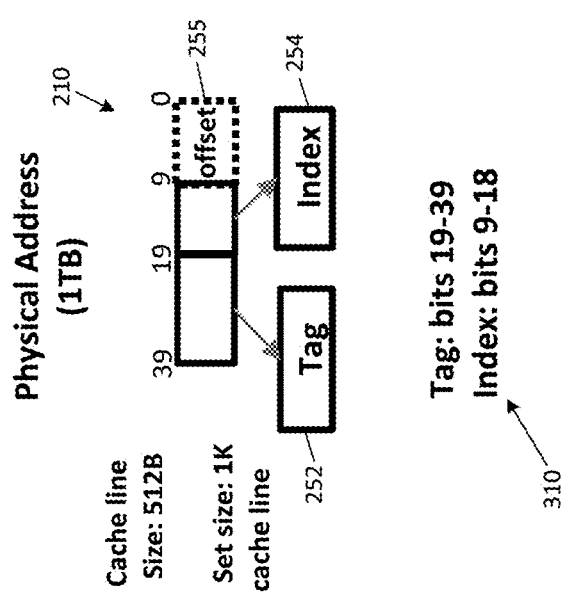
FIG. 3B is a diagram depicting a data access pattern and a corresponding index bitmapping according to the first cache-indexing scheme, according to one or more embodiments of the present disclosure.

FIG. 3B is a diagram depicting a data access pattern and a corresponding index bitmapping according to the first cache-indexing scheme, according to one or more embodiments of the present disclosure.

Referring to FIG. 3B, the first cache-indexing scheme 310 may correspond to a data access pattern 15. In one or more embodiments, the first cache-indexing scheme 310 may be determined based on considerations other than the data access pattern 15. For example, the index 254 of the first cache-indexing scheme 310 may be determined based on a number of least significant bit (LSB) positions (e.g., the three rightmost positions depicted in bold in FIG. 3B). Additionally, the tag 252 of the first cache-indexing scheme 310 may be determined based on a number of most significant bit (MSB) positions. Because the tag 252 indicates cache sets, and because the index 254 indicates cache lines CL, the data access pattern 15 may lead to cache conflicts (e.g., set conflicts) if the LSB positions refer to a relatively small number of cache lines and/or if the MSB positions refer to a relatively small number of cache sets. For example, if the three LSB positions are selected as index bits 222, because the LSB positions are all either 000 or 010, each physical address 210 (or a logical address or another type of memory address) may map to only a first cache line (e.g., 0-th cache line CL0) or a third cache line (e.g., CL2).

In one or more embodiments, the first cache-indexing scheme 310 may be determined based on an access pattern with characteristics, such as a flip frequency and/or a correlation, that have changed beyond a threshold allowing for a suitable distribution of data across the cache lines CL and the cache sets.

Figure 4A:
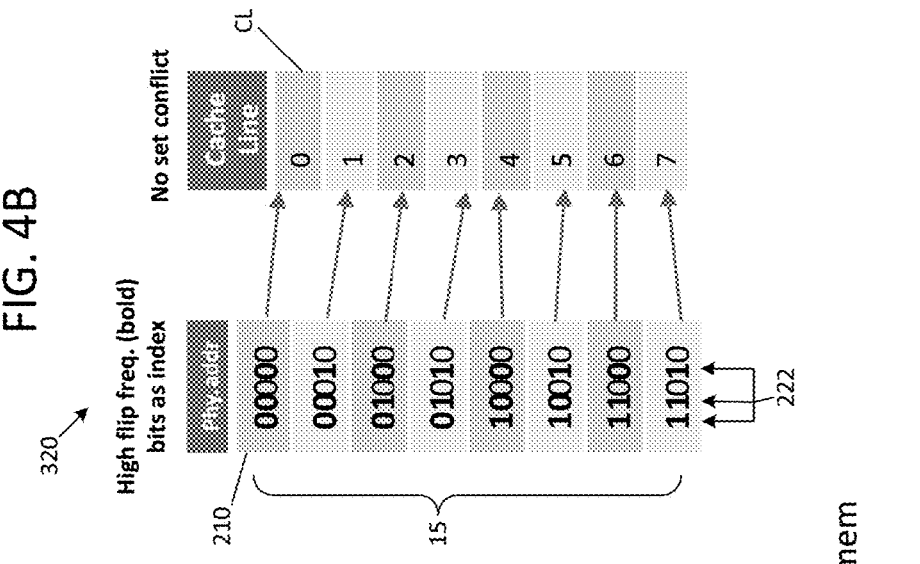
FIG. 4A is a diagram depicting bit sections of a physical address according to a second cache-indexing scheme, according to one or more embodiments of the present disclosure.

FIG. 4A is a diagram depicting bit sections of a physical address according to a second cache-indexing scheme, according to one or more embodiments of the present disclosure.

Referring to FIG. 4A, to improve the distribution of data across the cache lines and the cache sets, a second cache-indexing scheme 320 may be adjusted or changed based on the data access pattern 15. For example, bit positions 14-18 and bit positions 24-39 may correspond to the tag 252, while bit positions 9-13 and bit positions 19-23 may correspond to the index 254.

Figure 4B:
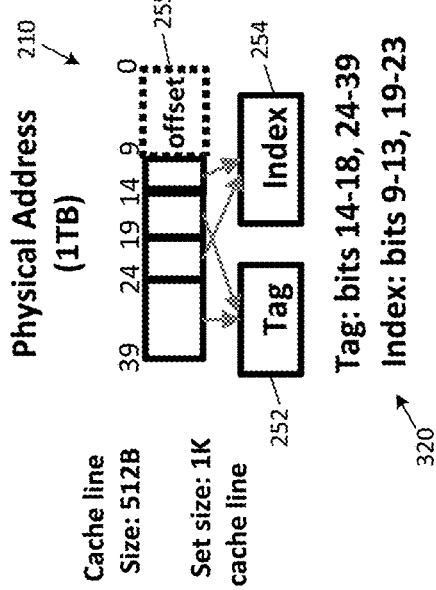
FIG. 4B is a diagram depicting a data access pattern and a corresponding index bitmapping according to the second cache-indexing scheme, according to one or more embodiments of the present disclosure.

FIG. 4B is a diagram depicting a data access pattern and a corresponding index bitmapping according to the second cache-indexing scheme, according to one or more embodiments of the present disclosure.

Referring to FIG. 4B, bit positions selected to represent the tag 252 and to represent the index 254 may be selected based on information generated from the data access pattern 15. For example, the three bit positions indicated in bold in FIG. 4B (e.g., the leftmost bit, the second-from-the-left bit, and the fourth-from-the-left bit) may be selected as index bits 222 because they all have a higher flip frequency than the two bit positions that are not selected (e.g., the third-from-the-left bit and the fifth-from-the-left bit).

Additionally, the three bit positions indicated in bold in FIG. 4B may be selected as index bits 222 because they are not highly correlated with each other. For example, when the three bit positions do not frequently flip at the same time. Accordingly, as depicted in FIG. 4B, the physical addresses 210 (or logical addresses or other types of memory addresses) refer to respective cache lines CL, resulting in a more even distribution of data across the cache lines CL and cache sets.

Figure 4C:
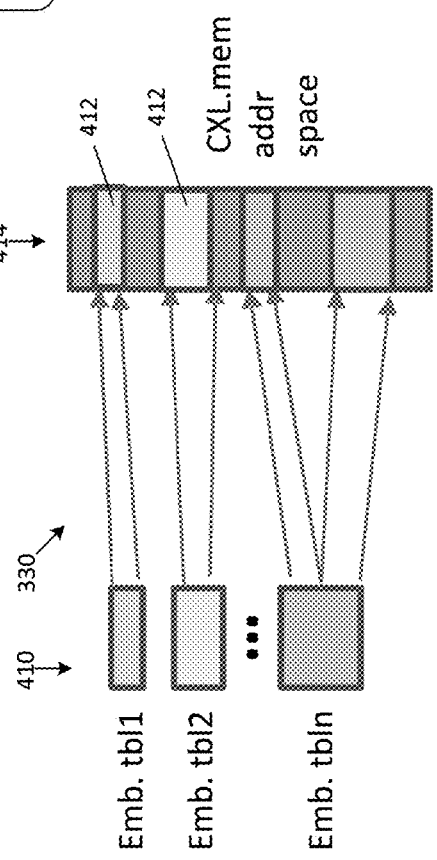
FIG. 4C is a diagram depicting physical address mapping with respect to a cache coherent memory address space, according to one or more embodiments of the present disclosure.

FIG. 4C is a diagram depicting physical address mapping with respect to a cache coherent memory address space, according to one or more embodiments of the present disclosure.

Referring to FIG. 4C, one or more aspects of one or more embodiments of the present disclosure may be suitable for use with a cache coherent protocol, such as Compute Express Link (CXL). For example, in a CXL-SSD File System (FS), a CXL.mem physical address may be mapped from a block address of an object file 412, and object files 412 may span a fractional space of a whole cache coherent memory address space 414. Additionally, CXL.mem address accessing patterns 330 may be characterized, and CXL may enable a processing circuit (e.g., an accelerator) to modify and directly access a storage device cache. Accordingly, space utilization and cache contention may be significantly improved in systems incorporating cache coherent memory protocols by utilizing one or more aspects of one or more embodiments of the present disclosure.

For example, FIG. 4C depicts an example with Deep Learning Recommendation Model (DLRM) embedded tables 410. In some embodiments, the DLRM embedded tables 410 may be mapped to cxl.mem address space non-uniformly and may span a small part of the cache coherent memory address space 414 (e.g., cxl.mem address space). With adaptive indexing, according to one or more aspects of one or more embodiments of the present disclosure, the cache performance may be improved.

FIG. 5 is a flowchart depicting methods of storing data in a cache based on a data access pattern, according to one or more embodiments of the present disclosure.

Referring to FIG. 5, a method 5000 of storing data in a cache based on a data access pattern may include the following. A storage device may receive, from an application running on a host, a request to access data stored on the storage device (operation 5001). The storage device may generate a first cache-indexing scheme by selecting, as an index bit, a first bit position of a physical address, the physical address corresponding to the request (operation 5002). The storage device may store the data in a cache of the storage device based on the first cache-indexing scheme (e.g., based on the data access pattern of the application) (operation 5003). The storage device may identify a change in the data access pattern (operation 5004). The storage device may generate a second cache-indexing scheme based on the change, wherein the data is more evenly distributed between a first cache location (e.g., a cache line and/or a cache set) and a second cache location (e.g., another cache line and/or another cache set) by using the second cache-indexing scheme (operation 5005).

Accordingly, one or more aspects of one or more embodiments of the present disclosure may provide advantages and improvements over some storage systems, such as: improving a cache hit rate by improving cache space utilization and reducing conflicts through the ability to dynamically adjust cache-indexing schemes based on workload characteristics; and reducing conflict misses by more uniformly spreading memory references to available cache locations. Additionally, one or more aspects of one or more embodiments of the present disclosure may leverage a cache coherent protocol (e.g., CXL) to: characterize address accessing patterns; enable a processor/accelerator to modify and directly access a storage device's cache; and map physical addresses from an object file's block address.

While embodiments of the present disclosure have been particularly shown and described with reference to the embodiments described herein, it will be understood by those of ordinary skill in the art that various changes in form and details may be made therein without departing from the spirit and scope of the present disclosure as set forth in the following claims, with functional equivalents thereof to be included therein.

What is claimed is:

1. A method of data storage, the method comprising:
receiving, from an application, a request to access data stored on a storage device;
identifying a data access pattern of the application;
generating a first cache-indexing scheme based on the data access pattern by selecting, based on the data access pattern, a first set of bit positions as an index bit set and a second set of bit positions as a cache tag bit set;
storing the data in a cache of the storage device based on the index bit set and the cache tag bit set;
identifying a change in the data access pattern; and
generating a second cache-indexing scheme based on the change.

2. The method of claim 1, wherein the generating the second cache-indexing scheme based on the change comprises:
selecting a third set of bit positions as a second index bit set and a fourth set of bit positions as a second cache tag bit set.

3. The method of claim 1,
wherein the data is more evenly distributed between a first cache location and a second cache location using the second cache-indexing scheme than using the first cache-indexing scheme.

4. The method of claim 1, further comprising programming a cache controller of the storage device to implement the first cache-indexing scheme by using a cache coherent protocol.

5. The method of claim 1, further comprising generating a cache tag and a cache index respectively based on the cache tag bit set and the index bit set.

6. The method of claim 1, wherein the first set of bit positions is selected as the index bit set based on a flip frequency of the bit positions in the first set.

7. The method of claim 1, wherein the first set of bit positions is selected as the index bit set based on a degree of correlation with a different bit position.

8. The method of claim 1, wherein the first set of bit positions is selected as the index bit set, instead of a different bit position, based on a degree of correlation with the different bit position.

9. A storage device, comprising:
a non-volatile memory;
a cache; and
a processing circuit configured to:
receive, from an application, a request to access data stored on the non-volatile memory;
identify a data access pattern of the application;
generate a first cache-indexing scheme based on the data access pattern by selecting, based on the data access pattern, a first set of bit positions as an index bit set and a second set of bit positions as a cache tag bit set;
store the data in the cache of the storage device based on the index bit set and the cache tag bit set;
identify a change in the data access pattern; and
generate a second cache-indexing scheme based on the change.

10. The storage device of claim 9, wherein the request indicates a memory address corresponding to the data.

11. The storage device of claim 9,
wherein the data is more evenly distributed between a first cache location and a second cache location using the second cache-indexing scheme.

12. The storage device of claim 10, wherein the storage device is configured to program a cache controller of the storage device to implement the first cache-indexing scheme by using a cache coherent protocol.

13. The storage device of claim 10, wherein the storage device is configured to generate a cache tag and a cache index for the memory address based on a first bit position.

14. The storage device of claim 10, wherein the storage device is configured to select the first set of bit positions as the index bit set based on a flip frequency of the bit positions in the first set.

15. A system, comprising:
a host;
a storage device; and
a non-transitory computer readable medium implemented on the storage device, and having computer code that, when executed on a processor, implements a method of data storage, the method comprising:
receiving, from an application on the host, a request to access data stored on the storage device;
identifying a data access pattern of the application based on the request;
generating a first cache-indexing scheme based on the data access pattern by selecting, based on the data access pattern, a first set of bit positions as an index bit set and a second set of bit positions as a cache tag bit set;

storing the data in a cache of the storage device based on the index bit set and the cache tag bit set;

identifying a change in the data access pattern; and generating a second cache-indexing scheme based on the change.

16. The system of claim 15, wherein the request indicates a memory address corresponding to the data.

17. The system of claim 15, wherein the data is more evenly distributed between a first cache location and a second cache location using the second cache-indexing scheme.

18. The system of claim 15, wherein the computer code, when executed on the processor, further implements the method of data storage by programming a cache controller of the storage device to implement the first cache-indexing scheme by using a cache coherent protocol.

19. The system of claim 15, wherein the computer code, when executed on the processor, further implements the method of data storage by generating a cache tag and a cache index respectively based on the cache tag bit set and the index bit set.

20. The system of claim 15, wherein the first set of bit positions is selected as the index bit set based on a flip frequency of the bit positions in the first set.

* * * * *